(12) United States Patent
Sandin et al.

(10) Patent No.: US 11,664,610 B2
(45) Date of Patent: May 30, 2023

(54) TELESCOPIC ELECTRIC CONDUCTOR AND HIGH VOLTAGE ARRANGEMENT

(71) Applicant: Hitachi Energy Switzerland AG, Baden (CH)

(72) Inventors: Bjorn Sandin, Ludvika (SE); Jonas Sandin, Borlänge (SE); Olov Andersson, Ludvika (SE); Neven Bucan, Ludvika (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/767,767

(22) PCT Filed: Oct. 21, 2019

(86) PCT No.: PCT/EP2019/078535
§ 371 (c)(1),
(2) Date: Apr. 8, 2022

(87) PCT Pub. No.: WO2021/078354
PCT Pub. Date: Apr. 29, 2021

(65) Prior Publication Data
US 2022/0416450 A1    Dec. 29, 2022

(51) Int. Cl.
*H01R 4/60* (2006.01)
*H01B 5/00* (2006.01)

(52) U.S. Cl.
CPC ............... *H01R 4/60* (2013.01); *H01B 5/006* (2013.01); *H01B 5/004* (2013.01)

(58) Field of Classification Search
CPC . H01R 4/60; H01R 4/58; H01B 5/006; H01B 5/004; H01B 5/00; H01B 7/06; H01B 7/065; H02B 1/54; H02B 5/00; H02G 11/00; H02G 5/02; H02G 11/006; H02G 5/06; H02G 5/00
(Continued)

(56) References Cited

U.S. PATENT DOCUMENTS

| 2,280,728 A | 4/1942 | Streib |
| 3,614,297 A * | 10/1971 | Carlson .................. H02G 9/065 |
| | | 174/70 B |

(Continued)

FOREIGN PATENT DOCUMENTS

| CN | 201303237 Y | 9/2009 |
| DE | 10244379 A1 | 4/2004 |

(Continued)

*Primary Examiner* — Angel R Estrada
(74) *Attorney, Agent, or Firm* — Slater Matsil, LLP (57) ABSTRACT

A telescopic electric conductor includes an electrically conductive first tube having a longitudinal axis and an electrically conductive second tube movable relative to the first tube along the longitudinal axis while being at least partly received within the first tube. An electrically conductive flexible self-supporting element is arranged inside the first tube and is mechanically and electrically connected to the first tube and to the second tube. The flexible element is arranged to elastically deform along the longitudinal axis. The flexible element has a waveform shape with several cycles of the waveform includes a number of sections that are welded together, each section having a shape of a half cycle of the waveform.

20 Claims, 4 Drawing Sheets

(58) Field of Classification Search
USPC .......... 174/69, 68.1, 70 R, 72 R, 74 R, 72 B,
174/71 B, 68.2, 88 B; 361/611, 624, 637,
361/648, 600, 601; 439/212, 213
See application file for complete search history.

(56) References Cited

U.S. PATENT DOCUMENTS

| | | | | |
|---|---|---|---|---|
| 5,149,017 | A * | 9/1992 | McEntire | B64F 1/305 |
| | | | | 248/49 |
| 5,661,263 | A * | 8/1997 | Salvaggio | H02G 3/0462 |
| | | | | 174/68.3 |
| 5,821,464 | A * | 10/1998 | Graham | H02G 5/06 |
| | | | | 174/88 B |
| 6,870,103 | B1 * | 3/2005 | Wiant | H02G 5/007 |
| | | | | 174/70 B |
| 7,183,502 | B1 * | 2/2007 | Johnston | H02G 3/0608 |
| | | | | 174/95 |
| 7,334,315 | B2 * | 2/2008 | Wiant | H02B 1/21 |
| | | | | 174/70 B |
| 8,900,002 | B2 * | 12/2014 | Mooney | H02G 5/007 |
| | | | | 439/212 |
| 2008/0143097 | A1 | 6/2008 | Canale | |

FOREIGN PATENT DOCUMENTS

| | | |
|---|---|---|
| EP | 0271328 B1 | 4/1992 |
| EP | 2555358 A1 | 2/2013 |
| EP | 2557636 A1 | 2/2013 |
| GB | 1354604 A | 5/1974 |
| JP | 2008506431 A | 3/2008 |
| WO | 2011119018 A2 | 9/2011 |

* cited by examiner

TELESCOPIC ELECTRIC CONDUCTOR AND HIGH VOLTAGE ARRANGEMENT

CROSS-REFERENCE TO RELATED APPLICATIONS

This application is a national stage application of International Application No. PCT/EP2019/078535, filed on Oct. 21, 2019, which application is hereby incorporated herein by reference.

TECHNICAL FIELD

The present disclosure generally relates to a telescopic electric conductor.

BACKGROUND

A high voltage arrangement may comprise various electric apparatuses connected to each other in order to form an electrical circuit. Such connections are often done by means of aluminum wires. The geometry of the wires is however difficult to control when the electric apparatuses move relative to each other. The wires may adopt uncontrolled shapes and thereby jeopardizing electric clearance. The wires can also create corona discharges due to narrow radiuses. This behavior of aluminum wires is particularly undesirable for higher electric fields and/or compact arrangements.

EP 2555358 A1 discloses a telescopic busbar device having a first conducting member and a second conducting member that are telescopically assembled so that the second conducting member can reversibly extend from an end part of the first conducting member along an axial direction for adjusting the length of the telescopic busbar. The telescopic busbar may also be integrated with functions such as expansion movement, damping of oscillation movements of the telescopic busbar and surge protection. Flexible connectors for connecting the telescopic busbar to connection points with integrated radial damping function are also described.

SUMMARY

The present disclosure generally relates to a telescopic electric conductor. In particular embodiments, a telescopic electric conductor and a high voltage arrangement comprising a telescopic electric conductor are provided.

In one embodiment, a telescopic electric conductor comprises an electrically conductive first tube having a longitudinal axis and an electrically conductive second tube movable relative to the first tube along the longitudinal axis while being at least partly received within the first tube. An electrically conductive flexible element is arranged inside the first tube. The flexible element is mechanically and electrically connected to the first tube and to the second tube and is arranged to elastically deform along the longitudinal axis.

BRIEF DESCRIPTION OF THE DRAWINGS

Further details, advantages and aspects of the present disclosure will become apparent from the following embodiments taken in conjunction with the drawings, wherein.

DETAILED DESCRIPTION OF ILLUSTRATIVE EMBODIMENTS

The following provides a discussion of a telescopic electric conductor that in various embodiments can provide various features and advantages. Embodiments of the present disclosure can provide one or more of the following features: a telescopic electric conductor that is dimensionally stable, a telescopic electric conductor that reduces a risk for corona discharge, a telescopic electric conductor that enables an aggressive dielectric design, a telescopic electric conductor that enables a compact design, a telescopic electric conductor that can withstand a high number of stress cycles, a telescopic electric conductor that has a cost-effective design, a telescopic electric conductor that has a simple design, a telescopic electric conductor that solves several or all of the foregoing objects in combination.

According to one aspect, a telescopic electric conductor comprises an electrically conductive first tube having a longitudinal axis; an electrically conductive second tube movable relative to the first tube along the longitudinal axis while being at least partly received within the first tube; and an electrically conductive flexible element arranged inside the first tube, the flexible element being mechanically and electrically connected to the first tube and to the second tube, and the flexible element being arranged to elastically deform along the longitudinal axis.

As the second tube moves relative to the first tube, the length of the telescopic electric conductor is varied. The second tube is free to move relative to the first tube against the elastic deformation of the flexible element. Since the flexible element is arranged inside the first tube, the flexible element may be referred to as an internal flexible. The telescopic electric conductor may be a telescopic busbar.

The telescopic electric conductor according to the present disclosure is physically stable. That is, at least during elastic deformation of the flexible element, the telescopic electric conductor only adopts well-defined geometries, in particular in contrast to prior art wire conductors associated with narrow radiuses and shapelessness. The telescopic electric conductor thus has high dimensional control. This enables the telescopic electric conductor according to the present disclosure to be installed in an insulation environment within relatively small spaces without risk of not meeting air clearance requirements.

Furthermore, since the flexible element is both mechanically connected and electrically connected to each of the first tube and the second tube, sliding contacts can be avoided. According to one variant, the telescopic electric conductor comprise no sliding contacts.

The telescopic electric conductor according to the present disclosure may comprise a galvanically connected electrically conductive path through the entire telescopic electric conductor. For example, solid metal may be provided along the electrically conductive path of the telescopic electric conductor. Alternatively, or in addition, the telescopic electric conductor may provide a continuous electrically conductive path with a cross-sectional area of at least 500 mm$^2$ along the entire telescopic electric conductor.

The flexible element may further be arranged to deform plastically along the longitudinal axis, i.e., beyond the elastic deformation range. By allowing the flexible element to deform plastically, a damping function is introduced to the telescopic electric conductor. When the flexible element deforms plastically, relative movements between the first tube and the second tube, along the longitudinal axis, can be damped. This is useful during earthquakes.

By means of the elastic deformation of the flexible element, the second tube can be moved relative to the first tube to provide some flexibility, e.g. for installation tolerances. The telescopic electric conductor may for example enable relative movement between the first tube and the second tube of at least 100 mm with only elastic deformation of the flexible element. If the second tube is largely displaced relative to the first tube, e.g. during an earthquake, the flexible element deforms plastically.

Each of the first tube, the second tube and the flexible element may be made of aluminum or an aluminum alloy comprising at least 95%, such as at least 99%, aluminum. Alternatively, or in addition, the first tube and the second tube may have a circular exterior profile. Also the entire, or substantially the entire, telescopic electric conductor may have a cylindrical shape. The cylindrical shape reduces the risk for corona discharge. A cylindrical shape of the telescopic electric conductor is dielectrically favorable. The telescopic electric conductor can thereby be installed in an environment with high electric fields with no or limited risk for partial discharge or flashover.

The flexible element may be arranged to elastically deform substantially uniformly, or uniformly, along the longitudinal axis. Thus, elastic deformation can be distributed over substantially the entire, or the entire, flexible element. In other words, elastic deformation can occur in one or several regions of the flexible element distributed over substantially the entire, or the entire, length of the flexible element along the longitudinal axis. In this way, the elastic deformation per unit length of the flexible element is relatively low. This in turn enables improved resistance against fatigue in the flexible element and the telescopic electric conductor can consequently withstand a higher number of stress cycles. Thus, the stress amplitude of the flexible element is minimized and the fatigue resistance of the flexible element is maximized.

The flexible element may comprise a waveform shape. A waveform shape of the flexible element further improves geometric stability. Any dedicated support arrangements for the flexible element can thereby be avoided. Thus, the flexible element may only be connected to one part of the first tube and to one part of the second tube. The waveform shape may be a sinusoidal shape or may comprise a plurality of connected circular segments, e.g. with an angular length of 180°. In case the waveform shape is sinusoidal, a length of the flexible element may comprise at least one, such as at least three, such as at least five, sinusoidal cycles.

The waveform shape may be substantially centered, or centered, with respect to the longitudinal axis. Alternatively, or in addition, the flexible element may comprise a plurality of sections. In this case, each section may have a shape of a half cycle of the waveform shape. The sections may be welded together.

The flexible element may comprise stacked sheet metal, such as stacked aluminum sheets. Each metal sheet may have a thickness of less than 1 mm. Each stack of sheet metal may comprise at least ten metal sheets.

The flexible element may be self-supporting. That is, prior to installation in the telescopic electric conductor, the flexible element can be supported at a single support point without the weight of the flexible element causes any substantial deformation, or any deformation, of the flexible element.

The flexible element may be arranged outside the second tube.

A length of the flexible element in a neutral state may be at least 20%, such as at least 40%, of a length of the first tube.

The telescopic electric conductor may have a current-carrying capacity of at least 500 amperes, such as at least 1000 amperes. The telescopic electric conductor may thus be a high current conductor.

The telescopic electric conductor may further comprise a first support structure fixed with respect to the first tube. In this case, the flexible element may be connected to the first support structure. The first support structure may be a plate.

The telescopic electric conductor may further comprise a second support structure fixed with respect to the second tube. In this case, the flexible element may be connected to the second support structure. The second support structure may be an end surface of the second tube.

The telescopic electric conductor may further comprise at least one connection arrangement. The connection arrangement may comprise a mechanical connection device for mechanically connecting the telescopic electric conductor to an external structure, and an electric connection device for electrically connecting the telescopic electric conductor the external structure.

Each connection arrangement may further comprise a terminal member. In this case, the terminal member may be mechanically and electrically connected to the external structure. Thus, each terminal member may be configured to provide mechanical support and current connection to the external structure.

Moreover, the mechanical connection device may be mechanically connected to the terminal member and the electric connection device may be electrically connected to the terminal member. According to one variant, the telescopic electric conductor comprises a first connection arrangement for electrically and mechanically connecting the first tube to a first external structure, and a second connection arrangement for electrically and mechanically connecting the second tube to a second external structure.

The mechanical connection device may comprise a joint allowing relative rotation about two axes perpendicular to the longitudinal axis. The joint may for example be a universal joint or a ball joint. By means of the joint, the telescopic electric conductor is free to move angularly relative to the external structure. The joint may provide axial rigidity (along the longitudinal axis) and angular flexibility between a terminal member and the remainder of the telescopic electric conductor.

The mechanical connection device may be configured to galvanically separate the external structure from the first tube and/or the second tube. In this way, it can be ensured that the major current path is through the electric connection device.

The electric connection device may comprise a flexible conductor. In this way, flexibility between a terminal member secured to the external structure and the remainder of the telescopic electric conductor is ensured. The flexible conductor may comprise sheet metal.

The telescopic electric conductor may further comprise at least one bearing arranged to support relative movements between the first tube and the second tube. The at least one bearing may comprise a first bearing and a second bearing, distanced from the first bearing along the longitudinal axis. In this way, the second tube can be maintained concentric with respect to the first tube during extension and contraction of the telescopic electric conductor. A distance between the first bearing and the second bearing may be at least 5%, such as at least 10%, of a length of the second tube.

Each of the at least one bearing may be a sliding plastic bearing, such as a polymer bearing. The sliding plastic bearing may comprise a plurality of plastic protrusions between the first tube and the second tube. The plastic protrusions may be attached to either the first tube or the second tube.

The first tube may comprise at least one opening for ventilating a space inside the first tube in which the flexible element is accommodated. By means of the opening, cooling air can reach the flexible element which can thereby be more efficiently cooled. In addition, the opening enables visual inspection of the flexible element.

According to a further aspect, there is provided a high voltage arrangement comprising a telescopic electric conductor according to the present disclosure. The high voltage arrangement may further comprise a high voltage unit. The high voltage unit according to the present disclosure may for example be constituted by a high voltage direct current (HVDC) semiconductor valve. Further examples of high voltage units are capacitors and breakers. A high voltage within the present disclosure may be a voltage of at least wo kV. Thus, a high voltage arrangement according to the present disclosure may have a system voltage of at least wo kV. The telescopic electric conductor according to the present disclosure may thus be suitable for use in a high voltage arrangement according to the present disclosure.

In the following paragraphs, a telescopic electric conductor, as well as a high voltage arrangement comprising a telescopic electric conductor, will be described with respect to the drawings. The same or similar reference numerals will be used to denote the same or similar structural features.

Figure 1:
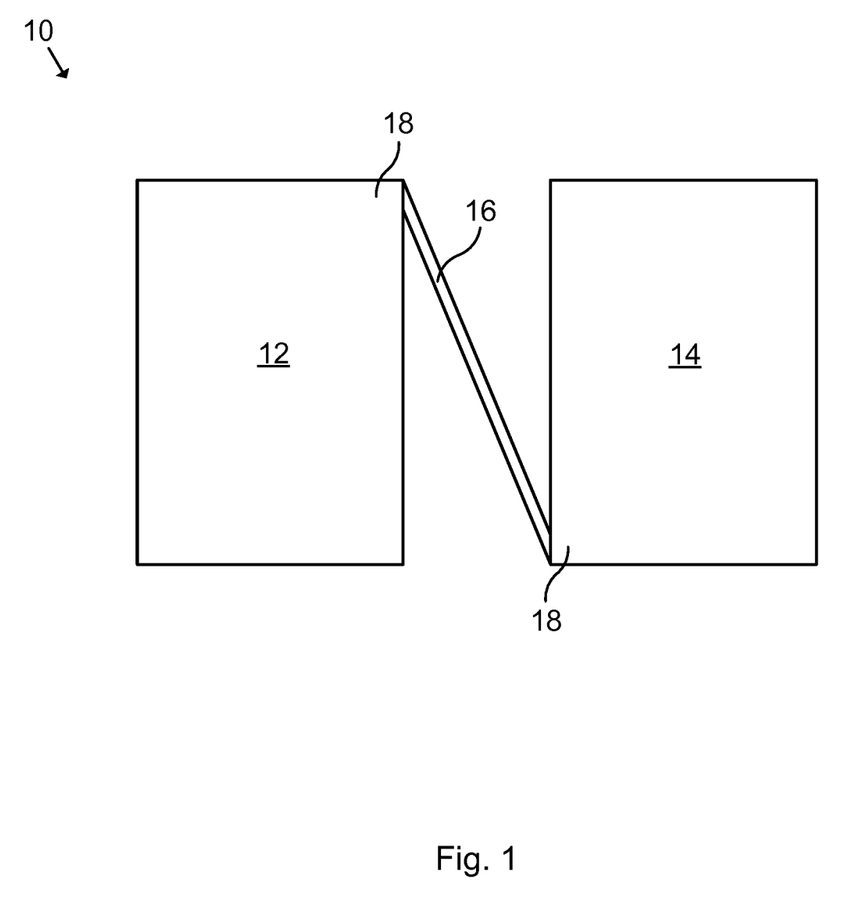
FIG. 1 schematically represents a high voltage arrangement comprising two high voltage units and a telescopic electric conductor.

FIG. 1 schematically represents a high voltage arrangement 10. The high voltage arrangement 10 of this example comprises a first high voltage unit 12, a second high voltage unit 14 and a telescopic electric conductor 16. Each high voltage unit 12, 14 is here exemplified as a HVDC semiconductor valve. The high voltage arrangement 10 has a system voltage of at least 100 kV.

The telescopic electric conductor 16 electrically connects the high voltage units 12, 14. To this end, the telescopic electric conductor 16 is fixed to an external structure 18 on each of the high voltage units 12, 14. The external structures 18 are thus structures external to the telescopic electric conductor 16. The telescopic electric conductor 16 allows some relative movements between the high voltage units 12, 14 while maintaining the electric connection. Larger relative movements between the high voltage units 12, 14, such as during earthquakes, can be damped by the telescopic electric conductor 16.

Figure 2:
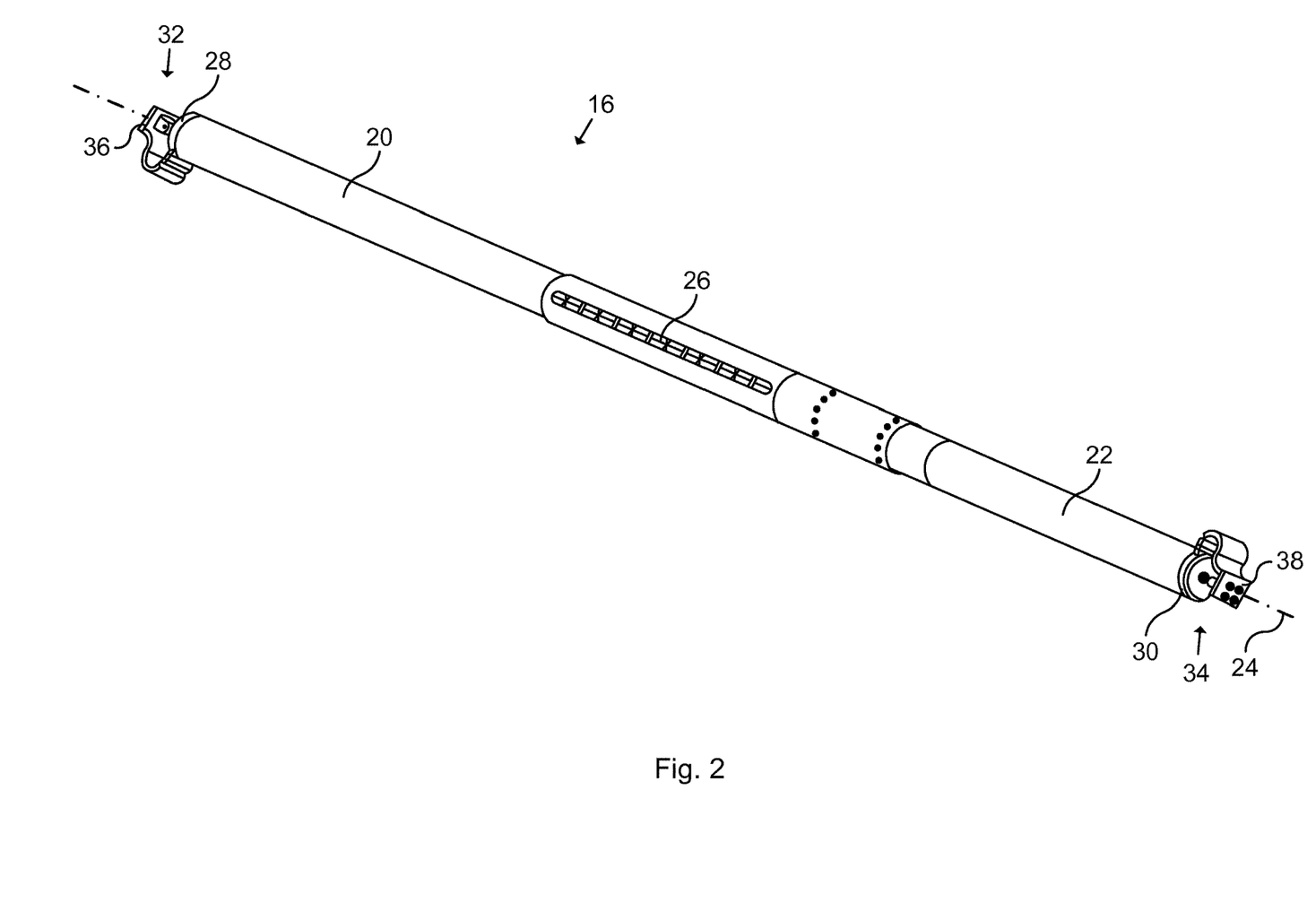
FIG. 2 schematically represents a perspective view of the telescopic electric conductor.

FIG. 2 schematically represents a perspective view of the telescopic electric conductor 16. The telescopic electric conductor 16 comprises a first tube 20 and a second tube 22. The telescopic electric conductor 16 is elongated and comprises a longitudinal axis 24. The second tube 22 is movable relative to the first tube 20 along the longitudinal axis 24. Both the first tube 20 and the second tube 22 are concentric with respect to the longitudinal axis 24.

The first tube 20 is provided with four openings 26 (only one is visible in FIG. 2). Each opening 26 is elongated in a direction parallel with the longitudinal axis 24.

Each of the first tube 20 and the second tube 22 are made of an electrically conductive material, such as an aluminum alloy comprising at least 99% aluminum. In this example, each of the first tube 20 and the second tube 22 are cylindrical. Thereby, the telescopic electric conductor 16 has a substantially cylindrical shape, which is dielectrically favorable.

As shown in FIG. 2, the second tube 22 is partly received in the first tube 20. The second tube 22 can move relative to the first tube 20 while being more or less received in the first tube 20. As the second tube 22 moves relative to the first tube 20, the length of the telescopic electric conductor 16 is varied.

The first tube 20 comprises a first end structure 28 and the second tube 22 comprises a second end structure 30. The first end structure 28 and the second end structure 30 are provided at opposite ends of the telescopic electric conductor 16. Each of the first end structure 28 and the second end structure 30 is here exemplified as an end plate closing one end of the first tube 20 and the second tube 22, respectively. The first end structure 28 and the second end structure 30 are made of an electrically conductive material, such as an aluminum alloy comprising at least 99% aluminum.

The telescopic electric conductor 16 further comprises a first connection arrangement 32 and a second connection arrangement 34. The first connection arrangement 32 comprises a first terminal member 36 and the second connection arrangement 34 comprises a second terminal member 38. The first terminal member 36 can be fixed to the external structure 18 of the first high voltage unit 12 and the second terminal member 38 can be fixed to the external structure 18 of the second high voltage unit 14. Each terminal member 36, 38 is thereby mechanically and electrically connected to the respective external structure 18. Both terminal members 36, 38 are made of an electrically conductive material, such as an aluminum alloy comprising at least 99% aluminum.

Figure 3:
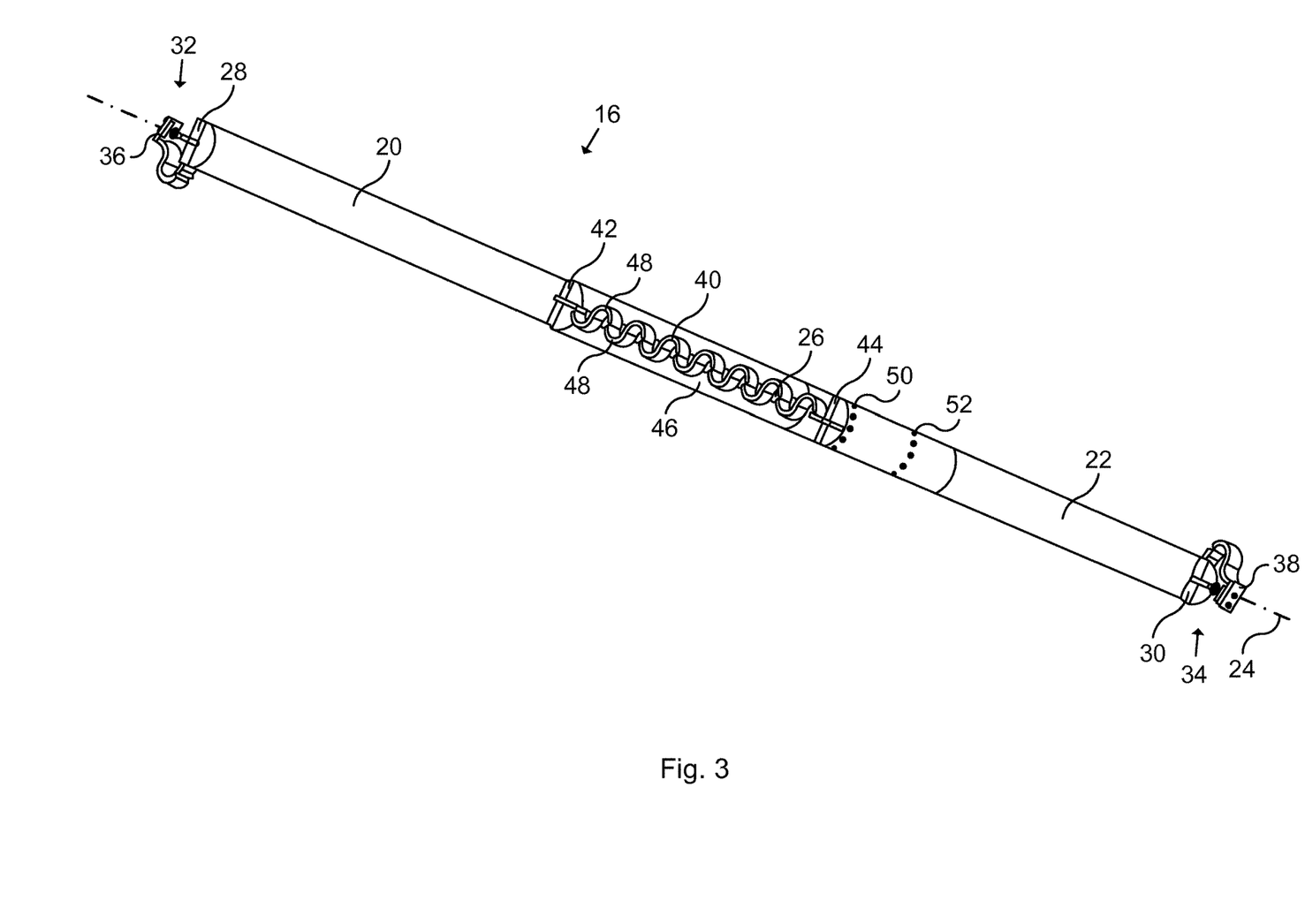
FIG. 3 schematically represents a perspective cross-sectional view of the telescopic electric conductor.

FIG. 3 schematically represents a perspective cross-sectional view of the telescopic electric conductor 16. As shown in FIG. 3, the telescopic electric conductor 16 further comprises an electrically conductive flexible element 40. The flexible element 40 is arranged inside the first tube 20.

The first tube 20 comprises a first support structure 42, here exemplified as a plate. The first support structure 42 is rigidly connected to the first tube 20. As shown in FIG. 3, a distance between the first end structure 28 and the first support structure 42 is approximately 50% to 60% of a length of the first tube 20 along the longitudinal axis 24.

The second tube 22 comprises a second support structure 44, here exemplified as an end plate of the second tube 22. The second support structure 44 is rigidly connected to the second tube 22. Each of the first support structure 42 and the second support structure 44 is made of an electrically conductive material, such as an aluminum alloy comprising at least 99% aluminum.

A first end of the flexible element 40 is fixedly and electrically connected to the first support structure 42. A second end of the flexible element 40 is fixedly and electrically connected to the second support structure 44. The flexible element 40 of this example is thus arranged outside the second tube 22. The flexible element 40 may for example be connected to the first support structure 42 and to the second support structure 44 by means of welding.

In FIG. 2, the flexible element 40 is in a neutral or unloaded state. The flexible element 40 is accommodated inside a space 46 in the first tube 20. The space 46 is defined inside the first tube 20 between the first support structure 42 and the second support structure 44.

In FIG. 3, also a second opening 26 in the first tube 20 can be seen. The openings 26 are arranged to ventilate the space 46 to cool the flexible element 40. The flexible element 40 can also be visually inspected through the openings 26.

The flexible element 40 is arranged to elastically deform along the longitudinal axis 24. The flexible element 40 has a waveform shape. In this example, the waveform shape is a sinusoidal shape, here comprising seven cycles. As shown in FIG. 3, the flexible element 40 is elongated and the sinusoidal shape thereof is centered over the longitudinal axis 24. In the neutral state of the flexible element 40 in FIG. 3, a length of the flexible element 40 along the longitudinal axis 24 is approximately 30% of a length of the first tube 20 along the longitudinal axis 24.

The flexible element 40 of this example is made up of stacked sheet metal, such as an aluminum alloy comprising at least 99% aluminum. The flexible element 40 comprises a plurality of sections 48. Each section 48 forms a half cycle of the sinusoidal shape. The sections 48 are welded together.

As an example, each metal sheet may have a thickness of 0.5 mm and 40 metal sheets may be stacked such that the thickness of the flexible element 40 is 20 mm. The flexible element 40 is thereby self-supporting and relatively stiff. As a consequence, any dedicated support arrangements for keeping the flexible element 40 correctly positioned can be dispensed with.

The telescopic electric conductor 16 further comprises a first bearing 50 and a second bearing 52. The bearings 50, 52 are arranged to support relative movements between the first tube 20 and the second tube 22. As shown in FIG. 3, the second bearing 52 is distanced from the first bearing 50 approximately 5% of a length of the first tube 20.

In this example, the bearings 50, 52 are sliding polymer bearings. Each bearing 50, 52 is constituted by a plurality of protrusions, here 12, provided on the first tube 20 and evenly distributed around the circumference of the first tube 20.

Figure 4:
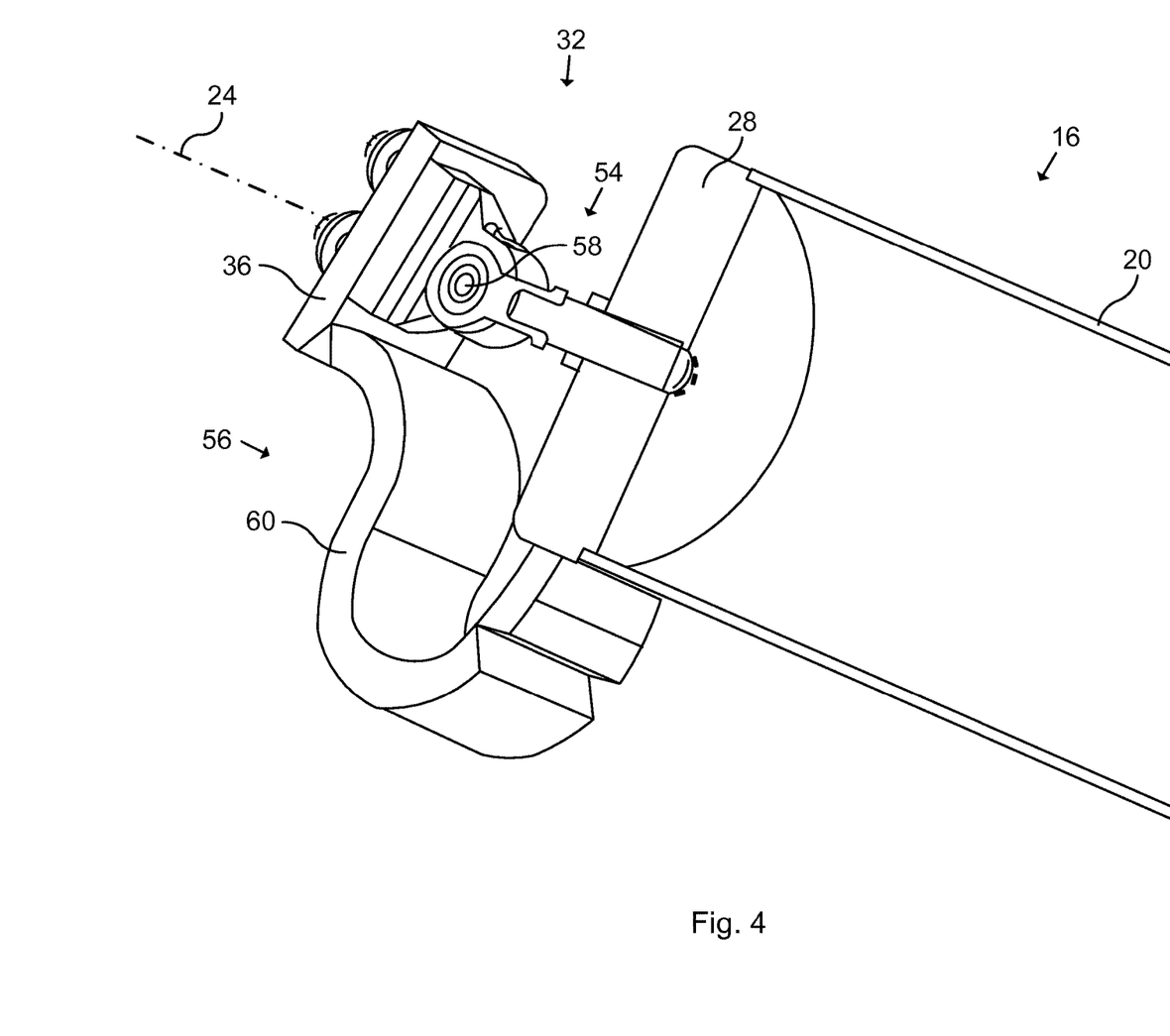
FIG. 4 schematically represents a partial enlarged view of the telescopic electric conductor.

FIG. 4 schematically represents a partial enlarged view of the telescopic electric conductor 16. In FIG. 4, the first connection arrangement 32 can be seen in closer detail. The following description of the first connection arrangement 32 in connection with the first tube 20 and the first terminal member 36 is equally applicable to the second connection arrangement 34 in connection with the second tube 22 and the second terminal member 38.

The first connection arrangement 32 comprises a mechanical connection device 54 and an electric connection device 56. The mechanical connection device 54 provides a mechanical connection between the first tube 20 and the first terminal member 36. The mechanical connection device 54 of this example comprises a ball joint 58. The ball joint 58 allows free relative rotation between the first terminal member 36 and the first tube 20. The ball joint 58 also provides axial rigidity along the longitudinal axis 24.

The electric connection device 56 provides an electric connection between the first tube 20 and the first terminal member 36. As shown in FIG. 4, the electric connection device 56 comprises a flexible conductor 60. The flexible conductor 60 is in this example connected to the first end structure 28 of the first tube 20. The flexible conductor 60 of this example is made of sheet metal, such as an aluminum alloy comprising at least 99% aluminum. The flexible conductor 60 is allowed to flex while being kept electrically connected to the first terminal member 36 and the first tube 20.

The mechanical connection device 54 galvanically separates the first terminal member 36 and the first tube 20. Thereby, practically all current, such as at least 99%, passes through the flexible conductor 60.

The telescopic electric conductor 16 thus provides an electric path through solid metal all the way from the first terminal member 36 to the second terminal member 38. The electric path of may never pass through a cross-sectional area smaller than 500 mm$^2$. In this example, the electric path passes from the first terminal member 36, through the flexible conductor 60 of the first connection arrangement 32, through the first end structure 28, along the first tube 20, through the first support structure 42, through the flexible element 40, through the second support structure 44, through the second tube 22, through the second end structure 30, through the flexible conductor 60 of the second connection arrangement 34 and to the second terminal member 38. The telescopic electric conductor 16 of this example has a current-carrying capacity of at least 1000 amperes. The electric path does not change due to retraction or extension of the telescopic electric conductor 16.

When the telescopic electric conductor 16 is retracted, the flexible element 40 is compressed while being maintained aligned with the longitudinal axis 24. By means of the bearings 50, 52, the second tube 22 is maintained concentric with the first tube 20. The telescopic electric conductor 16 thus always has a known geometry. This is desirable in order to meet air clearance requirements of the high voltage arrangement 10. As a further advantage, a more compact design of the high voltage arrangement 10 is enabled.

During initial compression, the flexible element 40 undergoes elastic deformation. Due to the design of the flexible element 40, the elastic deformation of the flexible element 40 is substantially evenly distributed along the length of the flexible element 40. Thus, elastic deformation per unit length of the flexible element 40 is relatively low. This increases the capability to withstand fatigue and thereby increases the ability of the telescopic electric conductor 16 to withstand a very high number of cyclic loads. The telescopic electric conductor 16 may enable relative movement between the first tube 20 and the second tube 22 of a few hundred millimeters with only elastic deformation of the flexible element 40.

During the compression of the flexible element 40, the flexible element 40 is maintained in electric connection with the first support structure 42 and the second support structure 44. Thus, any need for sliding contacts can be avoided. Furthermore, the first tube 20 and the second tube 22 move relative to each other strictly along the longitudinal axis 24. Thereby, a high dimensional control is provided which for example enables a more aggressive dielectric design of the high voltage arrangement 10 and/or the telescopic electric conductor 16.

In case the flexible element 40 is compressed to a larger extent, for example due to large relative movements between the high voltage units 12, 14 in the case of an earthquake, the flexible element 40 undergoes plastic deformation. The plastic deformation of the flexible element 40 dampens relative movements between the high voltage units 12, 14.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A telescopic electric conductor comprising:
   an electrically conductive first tube having a longitudinal axis;
   an electrically conductive second tube movable relative to the first tube along the longitudinal axis while being at least partly received within the first tube; and
   an electrically conductive flexible self-supporting element arranged inside the first tube, the flexible element being mechanically and electrically connected to the first tube and to the second tube, and the flexible element being arranged to elastically deform along the longitudinal axis, wherein the flexible element has a waveform shape comprising several cycles of the waveform, wherein the flexible element comprises a plurality of sections, wherein each section has a shape of a half cycle of the waveform, and wherein the sections are welded together.

2. The telescopic electric conductor according to claim 1, wherein the flexible element is arranged to elastically deform substantially uniformly along the longitudinal axis.

3. The telescopic electric conductor according to claim 1, wherein the waveform shape is substantially centered with respect to the longitudinal axis.

4. The telescopic electric conductor according to claim 1, wherein the flexible element comprises stacked sheet metal.

5. The telescopic electric conductor according to claim 1, wherein the flexible element is arranged outside the second tube.

6. The telescopic electric conductor according to claim 1, wherein a length of the flexible element in a neutral state is at least 20% of a length of the first tube.

7. The telescopic electric conductor according to claim 1, wherein the telescopic electric conductor has a current-carrying capacity of at least 500 amperes.

8. The telescopic electric conductor according to claim 1, further comprising a first support structure fixed with respect to the first tube, wherein the flexible element is connected to the first support structure.

9. The telescopic electric conductor according to claim 8, wherein the first support structure is a plate.

10. The telescopic electric conductor according to claim 1, further comprising a second support structure fixed with respect to the second tube, wherein the flexible element is connected to the second support structure.

11. The telescopic electric conductor according to claim 10, wherein the second support structure is an end surface of the second tube.

12. The telescopic electric conductor according to claim 1, further comprising a bearing arranged to support relative movements between the first tube and the second tube.

13. The telescopic electric conductor according to claim 12, wherein the bearing is a sliding plastic bearing.

14. The telescopic electric conductor according to claim 1, wherein the first tube comprises at least one opening for ventilating a space inside the first tube in which the flexible element is accommodated.

15. A telescopic electric conductor comprising:
    an electrically conductive first tube having a longitudinal axis;
    an electrically conductive second tube movable relative to the first tube along the longitudinal axis while being at least partly received within the first tube; and
    an electrically conductive flexible self-supporting element arranged inside the first tube, the flexible element being mechanically and electrically connected to the first tube and to the second tube, and the flexible element being arranged to elastically deform along the longitudinal axis, wherein the flexible element has a waveform shape comprising several cycles of the waveform, wherein the flexible element comprises a plurality of sections, wherein each section has a shape of a half cycle of the waveform, and wherein the sections are welded together; and
    at least one connection arrangement that comprises a mechanical connection device for mechanically connecting the telescopic electric conductor to an external structure, and an electric connection device for electrically connecting the telescopic electric conductor the external structure.

16. The telescopic electric conductor according to claim 15, wherein the mechanical connection device comprises a joint allowing relative rotation about two axes perpendicular to the longitudinal axis.

17. The telescopic electric conductor according to claim 15, wherein the mechanical connection device is configured to galvanically separate the external structure from the first tube and/or the second tube.

18. The telescopic electric conductor according to claim 15, wherein the electric connection device comprises a flexible conductor.

19. The telescopic electric conductor according to claim 18, wherein the flexible conductor comprises sheet metal.

20. A telescopic electric conductor comprising:
    an electrically conductive first tube having a longitudinal axis;
    an electrically conductive second tube movable relative to the first tube along the longitudinal axis while being at least partly received within the first tube;
    an electrically conductive flexible self-supporting element arranged inside the first tube, the flexible element being mechanically and electrically connected to the first tube and to the second tube, and the flexible element being arranged to elastically deform along the longitudinal axis, wherein the flexible element has a waveform shape comprising several cycles of the waveform, wherein the flexible element comprises a plurality of sections, wherein each section has a shape of a half cycle of the waveform, and wherein the sections are welded together;
    a first support structure fixed with respect to the first tube, wherein the flexible element is connected to the first support structure, wherein the first support structure is a plate; and
    a second support structure connected to the flexible element, wherein the second support structure is an end surface of the second tube.

* * * * *